(12) United States Patent
Li

(10) Patent No.: US 8,288,035 B2
(45) Date of Patent: Oct. 16, 2012

(54) MODULAR BATTERY PACK

(75) Inventor: Kevin Li, Brighton, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 673 days.

(21) Appl. No.: 12/431,278

(22) Filed: Apr. 28, 2009

(65) Prior Publication Data

US 2010/0178547 A1     Jul. 15, 2010

Related U.S. Application Data

(60) Provisional application No. 61/143,498, filed on Jan. 9, 2009.

(51) Int. Cl.
     *H01M 2/00*     (2006.01)
     *H01M 2/26*     (2006.01)
     *H01M 2/28*     (2006.01)
     *H01M 6/00*     (2006.01)
     *H01M 6/42*     (2006.01)

(52) U.S. Cl. .................. 429/151; 429/121; 429/149

(58) Field of Classification Search .............. 429/120, 429/151, 163
See application file for complete search history.

(56) References Cited

U.S. PATENT DOCUMENTS

| | | | | |
|---|---|---|---|---|
| 3,147,151 | A * | 9/1964 | Toce | 429/120 |
| 4,084,037 | A | 4/1978 | Morton | |
| 4,265,984 | A * | 5/1981 | Kaye | 429/178 |
| 5,962,159 | A | 10/1999 | Satou et al. | |
| 6,406,812 | B1 | 6/2002 | Dreulle et al. | |
| 6,419,091 | B1 | 7/2002 | Gaffney et al. | |
| 6,451,475 | B1 | 9/2002 | Sherwood | |
| 6,478,158 | B2 | 11/2002 | Gaffney et al. | |
| 7,141,330 | B2 | 11/2006 | Aoyama | |
| 7,195,840 | B2 | 3/2007 | Kaun | |
| 2007/0160901 | A1 | 7/2007 | Kaun | |
| 2008/0085446 | A1 | 4/2008 | Schmidt et al. | |
| 2008/0118819 | A1 | 5/2008 | Gamboa et al. | |

FOREIGN PATENT DOCUMENTS

| EP | 1164645 | 12/2001 |
|---|---|---|
| GB | 2044983 | 10/1980 |

OTHER PUBLICATIONS

European Search Report for to Application No. 10150374.6 dated May 4, 2010, Applicant—Electrochem Solutions, Inc.

* cited by examiner

*Primary Examiner* — Raymond Alejandro
*Assistant Examiner* — Steven Scully
(74) *Attorney, Agent, or Firm* — Michael F. Scalise

(57) ABSTRACT

A modular battery pack comprised of multiple modular batteries arranged in series, in parallel, or in series-parallel combinations is described. Each of the modular batteries is comprised of a first pair of opposed keyed side walls for series connection between adjacent modular batteries, and a second pair of opposed keyed side walls for parallel connection between adjacent modular batteries. The modular batteries are only able to connect to each other when the keys are matched and aligned. Additionally, the opposed end walls of the modular batteries have specifically configured terminals that prevent the possibility of making undesired connections between adjacent modular batteries.

20 Claims, 12 Drawing Sheets

MODULAR BATTERY PACK

CROSS-REFERENCE TO RELATED APPLICATION

The present application claims priority from U.S. Provisional Application Ser. No. 61/143,498, filed Jan. 9, 2009.

BACKGROUND OF THE INVENTION

1. Field of the Invention

The present invention relates generally to batteries used as direct current electrical power supplies. More particularly, the present invention relates in one embodiment to a modular battery having external geometric features which enable multiples of the modular batteries to be connected to each other in specific series and/or parallel combinations to produce combined modular battery packs having desired output voltages.

2. Description of Related Art

Electrochemical cells or batteries in numerous external configurations are well known. A battery will generally provide energy at a given voltage over much of its life, with the voltage dependent upon the particular electrochemical reactions at the electrodes within the battery.

It is also well known that the electrodes of batteries may be connected together in series to produce output voltages of multiples of the single battery voltage, or in parallel to produce higher current capacity at the single battery voltage, or in combinations of series and parallel. Absent any special provisions in the batteries, the series and/or parallel connections must be made with external wiring or other electrical connections, which is cumbersome and unreliable. The batteries may be provided with features that facilitate series and/or parallel interconnections between them.

In spite of these features, however, it is typically possible to connect one or more batteries together improperly, such that the combination produces no voltage, an undesired voltage, and/or reverse charging of one or more of the batteries. In the worst case, the errant connection may cause short circuiting of the batteries. This is a dangerous condition, which can result in fire, explosion, and/or the release of toxic chemicals, all of which may damage property and injure personnel.

There remains a need for a connectable modular battery, multiples of which can be easily connected together in series and/or parallel configurations in an error-free manner by unskilled workers in a manufacturing facility or at the user's site. Such a battery would have use in a variety of fields, such as energy production, electric and/or hybrid vehicles, environmental sensing, communications, medical, and military applications.

SUMMARY OF THE INVENTION

The problem of connecting multiple batteries in series and/or parallel configurations in an error free manner to provide a combined battery pack having a desired voltage and current capacity is solved by providing multiple modular batteries, wherein each modular battery includes a first pair of opposed keyed side walls for series connection between adjacent modular batteries, and a second pair of opposed keyed side walls for parallel connection between adjacent modular batteries. The opposed end walls of the modular batteries have specifically configured terminals that prevent the possibility of making undesired connections between adjacent batteries, which could result in zero voltage, undesired voltage, or in the worst case, short circuiting of the batteries.

More specifically, in accordance with the present invention there is provided a modular battery comprising a single cell of a first electrode of a first polarity and a second electrode of a second polarity contained within a casing. The casing is comprised of a first pair of opposed keyed side walls. A first side wall of the first pair includes an upper end, a lower end, and a first male key. A second side wall of the first pair includes an upper end, a lower end, and a first female key matched to the first male key. In a similar manner, the casing may include a second pair of opposed keyed side walls. A first side wall of the second pair includes an upper end, a lower end, and a second male key; and a second side wall of the second pair includes an upper end, a lower end, and a second female key matched to the second male key. The first male key differs from the second male key, such that the first male key cannot be connected to the second female key, and the second male key cannot be connected to the first female key.

The casing is further comprised of first and second end walls. The first end wall may include a first series terminal cavity proximate to the upper end of the first side wall of the first pair of opposed keyed side walls, a first parallel terminal cavity proximate to the upper end of the first side wall of the second pair of opposed keyed side walls, and a second parallel terminal cavity proximate to the upper end of the second side wall of the second pair of opposed keyed side walls. The second end wall may include a second series terminal cavity proximate to the lower end of the second side wall of the first pair of opposed keyed side walls, a third parallel terminal cavity proximate to the lower end of the first side wall of the second pair of opposed keyed side walls, and a fourth parallel terminal cavity proximate to the lower end of the second side wall of the second pair of opposed keyed side walls.

Means for connecting the respective terminals of adjacent batteries in series or in parallel in an error-free manner are further provided. The means for connecting the terminals may comprise conductive connector bars. Each conductive connector bar is electrically connected to a pair of terminals that are provided proximate to each other when a pair of modular batteries is mechanically connected to each other in a series or parallel relationship using their respective pairs of matched keys. When conductive connector bars are used, the respective terminal cavities in the end walls of the modular batteries are formed as slots. The slots are provided with specific shapes, such that when a pair of modular batteries are placed adjacent to each other, and a pair of male and female keys on the casing side walls are engaged with each other, the pair of slots also align with each other, thereby forming a single recessed slot having the same shape as the conductor bar. The conductor bar can then be disposed in the recessed slot to make the connection between the terminals.

The slots are provided with two different shapes, one shape for series connection, and one shape for parallel connection. The conductor bars are also provided in two different corresponding shapes. Additionally, the slots are located in the respective end walls in specific positions, so that it is not possible to make a short-circuit connection between adjacent modular batteries. In that manner, error-free series and parallel connections between adjacent modular batteries are enabled.

Within the casing of the modular battery, first and second conductive terminal members are provided for connection to the respective battery electrodes. The first conductive terminal member is in electrical contact with the first electrode of the first cell and with a first terminal at the first series terminal cavity, a second terminal at the first parallel terminal cavity, and a third terminal at the second parallel terminal cavity. The second conductive terminal member is in electrical contact with the second, opposite electrode of the first or a second cell and with a fourth terminal at the second series terminal cavity, a fifth terminal at the third parallel terminal cavity, and a sixth terminal at the fourth parallel terminal cavity.

The modular battery may further include additional electrodes connected in series and/or in parallel to each other and to the first and second, opposite polarity electrodes. The electrodes may be configured in pairs and may be contained in individual casings formed as cells within the main casing. The modular battery may be formed as a battery pack comprised of individual battery cells connected to each other and contained within the keyed battery casing. Such a battery pack may be comprised of a first cell including the first electrode, and a second cell including the second, opposite polarity electrode, wherein the first cell and the second cell are connected to each other.

The modular batteries as described herein may be connected to each other in series, or in parallel, or in series and parallel combinations. To make a series connection between first and second adjacent modular batteries, the second modular battery is inverted with respect to the first modular battery, and the first male key of the first modular battery is engaged with the first female key of the second modular battery. The first terminal of the first modular battery is then electrically connected to the fourth terminal of the second modular battery. The fourth terminal of the first modular battery and the first terminal of the second modular battery are then available for connection to a load to be powered, or to additional adjacent modular batteries in series.

To make a parallel connection between first and second adjacent modular batteries, the second male key of the first modular battery is engaged with the second female key of the second modular battery. The second terminal of the first modular battery is electrically connected to the third terminal of the second modular battery, and the fifth terminal of the first modular battery is electrically connected to the sixth terminal of the second modular battery.

To make a series and parallel connection between groups of modular batteries, a first set of two or more series-connected batteries are connected in parallel to a second set of two or more series-connected batteries. Alternatively, a first set of batteries connected in parallel may be series-connected to a second set of batteries connected in parallel. The series-parallel battery pack may also be connected "one battery at a time." The unique keyed side walls of the battery casings and end wall terminal cavity configurations enable this to be done in an error-free manner.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which.

Figure 1:
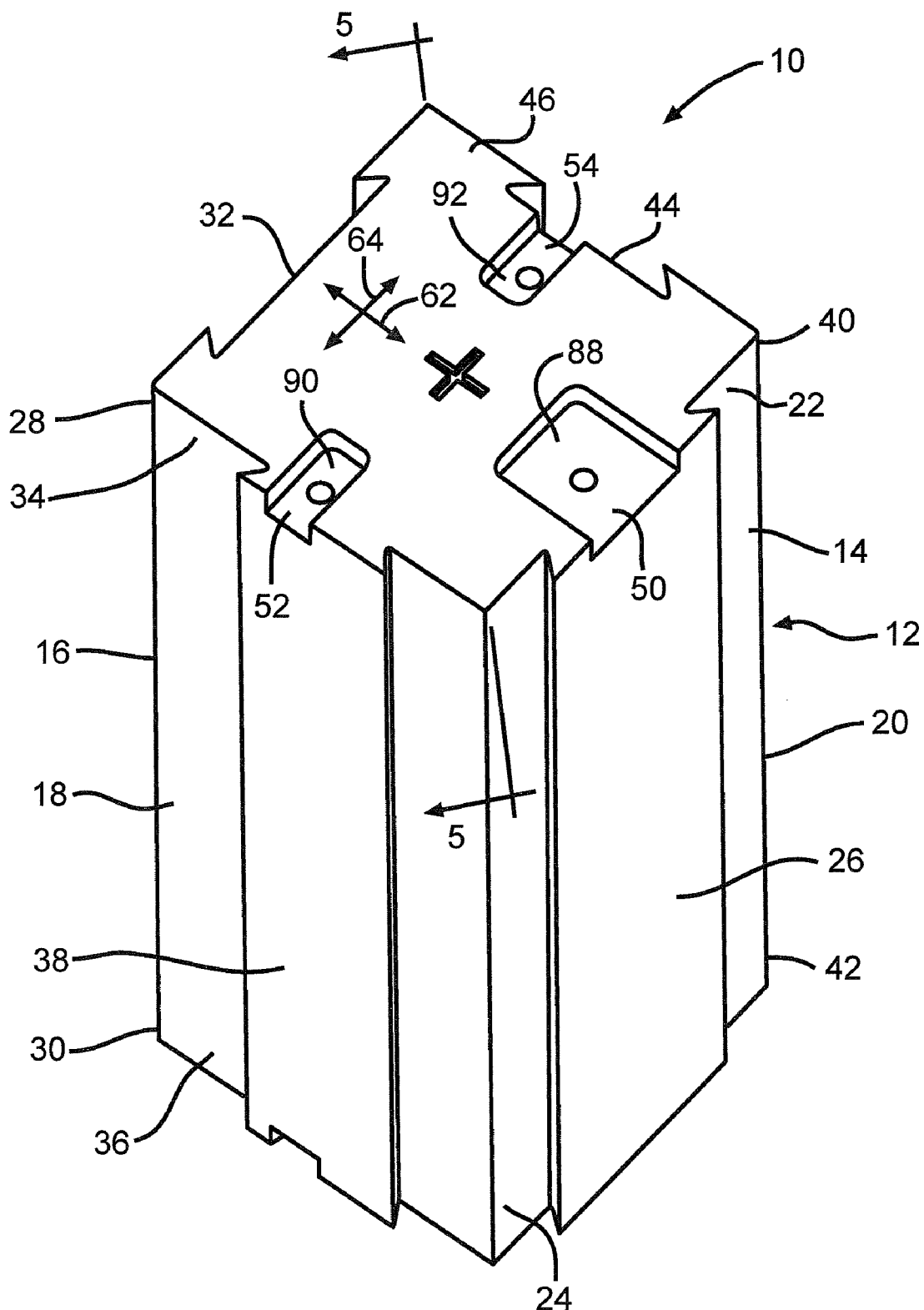
FIG. 1 is an upper perspective view of a modular battery 10 of the present invention, multiples of which can be combined in series and/or parallel combinations to provide combined battery packs of the present invention.

The present invention will be described in connection with a preferred embodiment. However, it is to be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

For a general understanding of the present invention, reference is made to the drawings. In the drawings, like reference numerals have been used throughout to designate identical elements. Additionally, the description identifies certain battery components and/or structures with the adjectives "top," "upper," "bottom," "lower," "side," etc. It is noted that the battery and battery pack orientations shown in the drawings are arbitrary, and that these adjectives are provided for the sake of clarity in the description. The adjectives are not to be construed as limiting the modular batteries or battery packs to use in a particular spatial orientation. The modular batteries and battery packs may be used in orientations other than those shown and described herein.

Referring first to FIGS. 1 and 1A to 1C, there is provided a modular battery 10, multiples of which can be further combined in series and/or parallel combinations to provide battery packs having desired voltages and current capacities. Modular battery 10 is comprised of a first electrode of a first polarity and a second, opposite electrode of a second polarity contained within a casing 12. Details regarding the opposite polarity electrodes, and on other electrode configurations and internal series and parallel cell configurations of the battery will be discussed subsequently herein with reference to FIGS. 5 to 7. In general, the present invention is applicable to batteries and battery packs having a broad range of electrode and internal cell configurations. The operative requirement is that the battery or battery pack include an electrode of a first polarity, an electrode of a second, opposite polarity, and certain casing features that will now be described. When the "battery pack" includes only a single cathode and anode system, it may be considered as simply a "battery" comprised of one electrochemical cell.

The casing 12 is comprised of a first pair of opposed keyed side walls 14 and 16, and a second pair of opposed keyed side walls 18 and 20. The first side wall 14 of the first pair includes an upper end 22, a lower end 24, and a first male key 26. The second side wall 16 of the first pair includes an upper end 28, a lower end 30, and a first female key 32 matched to the first male key 26. In a similar manner, the first side wall 18 of the second pair includes an upper end 34, a lower end 36, and a second male key 38; and the second side wall 20 of the second pair includes an upper end 40, a lower end 42, and a second female key 44 matched to the second male key 38. The first male key 26 differs from the second male key 38.

The casing 12 is further comprised of first and second end walls 46 and 48. The first end wall 46 may include a first series terminal cavity 50 proximate to the upper end 22 of the first side wall 14 of the first pair of opposed keyed side walls, a first parallel terminal cavity 52 proximate to the upper end 34 of the first side wall 18 of the second pair of opposed keyed side walls, and a second parallel terminal cavity 54 proximate to the upper end 40 of the second side wall 20 of the second pair of opposed keyed side walls. The second end wall 48 may include a second series terminal cavity 56 proximate to the lower end 30 of the second side wall 16 of the first pair of opposed keyed side walls, a third parallel terminal cavity 58 proximate to the lower end 36 of the first side wall 18 of the second pair of opposed keyed side walls, and a fourth parallel terminal cavity 60 proximate to the lower end 42 of the second side wall 20 of the second pair of opposed keyed side walls.

An electrical terminal is provided at each of the respective terminal cavities in the first and second end walls 46 and 48. The terminals are electrically connected to the electrodes within the modular battery 10, and are accessible at their respective terminal cavities for connection to adjacent modular battery terminals or to a load to be powered. Although the terminals are represented as simple circular openings in FIGS. 1, 1A, 1B and 1C, the terminals are comprised of solid conductive bodies beneath the end walls 46 and 48 as will be explained subsequently with reference to FIGS. 5 to 7. An electrical connection can be made to any one of the terminals by engaging a connector such as a metal screw or a plug-in jack with the terminal hole. Alternatively, a terminal may include a short conductive post (not shown) that protrudes up into the terminal cavity, to which an electrical connection can be made.

Referring again to FIGS. 1, 1A, 1B and 1C, a first terminal 51 (FIG. 1B) is accessible at the first series terminal cavity 50, a second terminal 53 (FIG. 1B) is accessible at the first parallel terminal cavity 52, a third terminal 55 (FIG. 1B) is accessible at the second parallel terminal cavity 54, a fourth terminal 57 (FIG. 1C) is accessible at the second series terminal cavity 56, a fifth terminal 59 (FIG. 1C) is accessible at the third parallel terminal cavity 58, and a sixth terminal 61 (FIG. 1C) is accessible at the fourth parallel terminal cavity 60.

Multiple units of the modular battery 10 are connectible in series, in parallel, or in series-parallel combinations. The respective pairs of matched male and female keys 26 and 32, and 38 and 44 provide mechanical means for connecting the casings 12 of the modular batteries 10. The terminals in the terminal cavities at the end walls 46 and 48 may be connected in series and parallel arrangements by electrically conductive means. The specific size and locations of the male and female keys, and of the terminal cavities are provided such that the series and parallel connections are made in an error-free manner, as will now be explained.

Referring again to FIGS. 1, 1A and 1B, the modular battery 10 may be considered to have a "series axis" indicated by bidirectional arrow 62, and a "parallel axis" indicated by bidirectional arrow 64. When multiple modular batteries 10 are aligned with each other along their series axes 62, they are connectable in series, and when the batteries 10 are aligned with each other along their parallel axes 64, they are connectable in parallel.

Figure 1A:
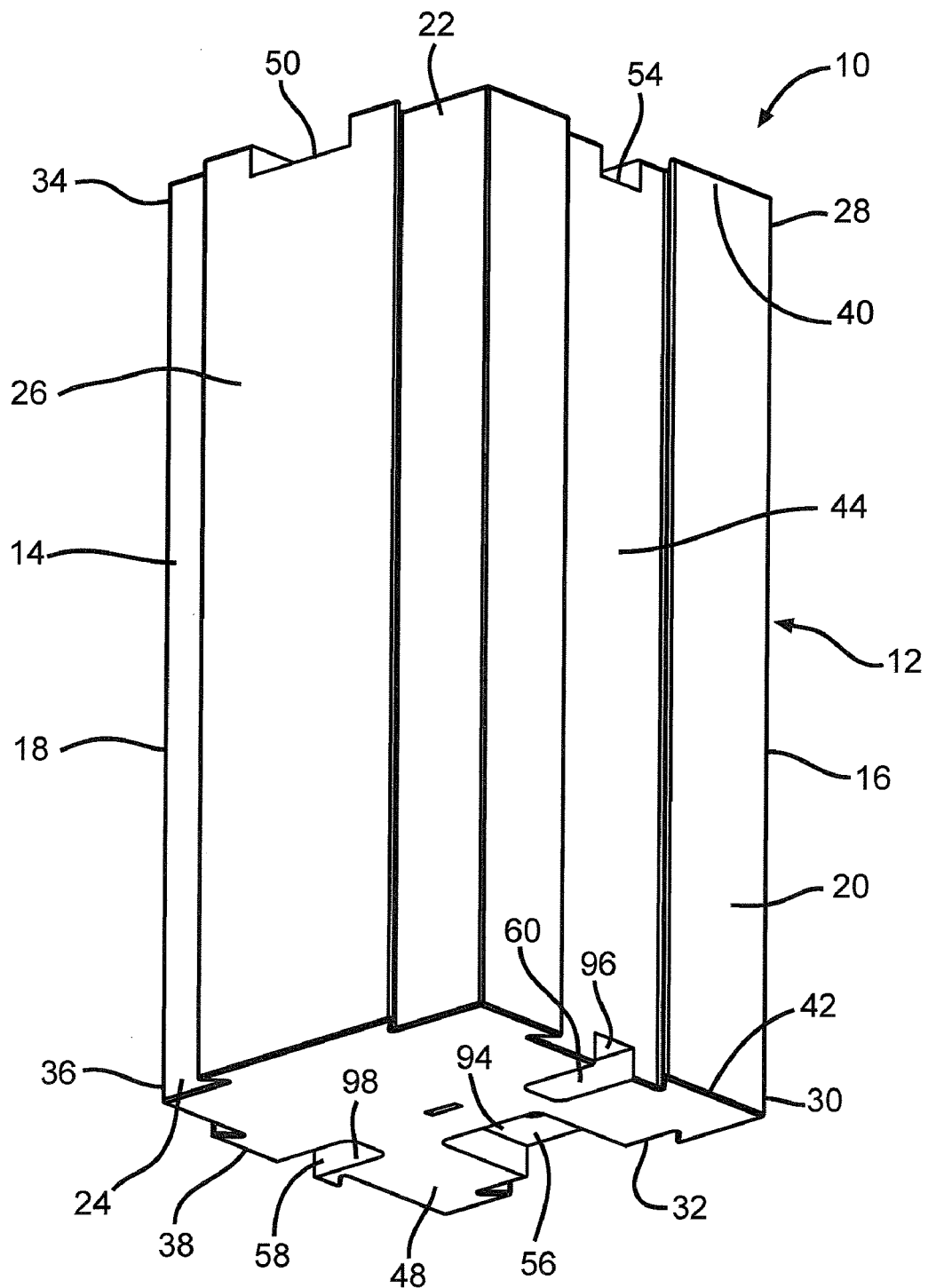
FIG. 1A is a lower perspective view of the modular battery 10 of FIG. 1.
Figure 1B:
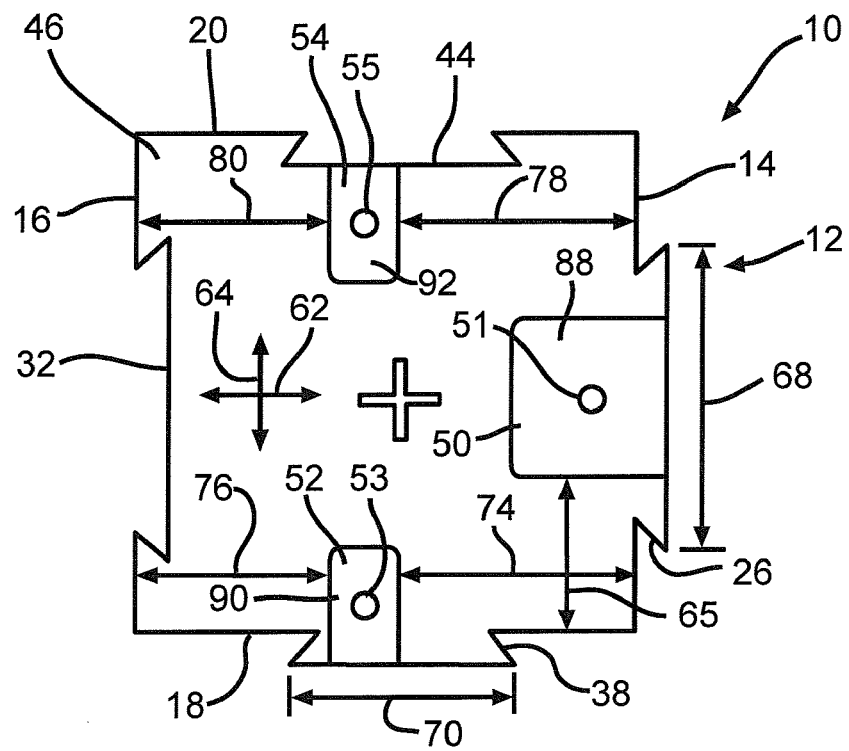
FIG. 1B is a top view of the modular battery 10 of FIG. 1.
Figure 1C:
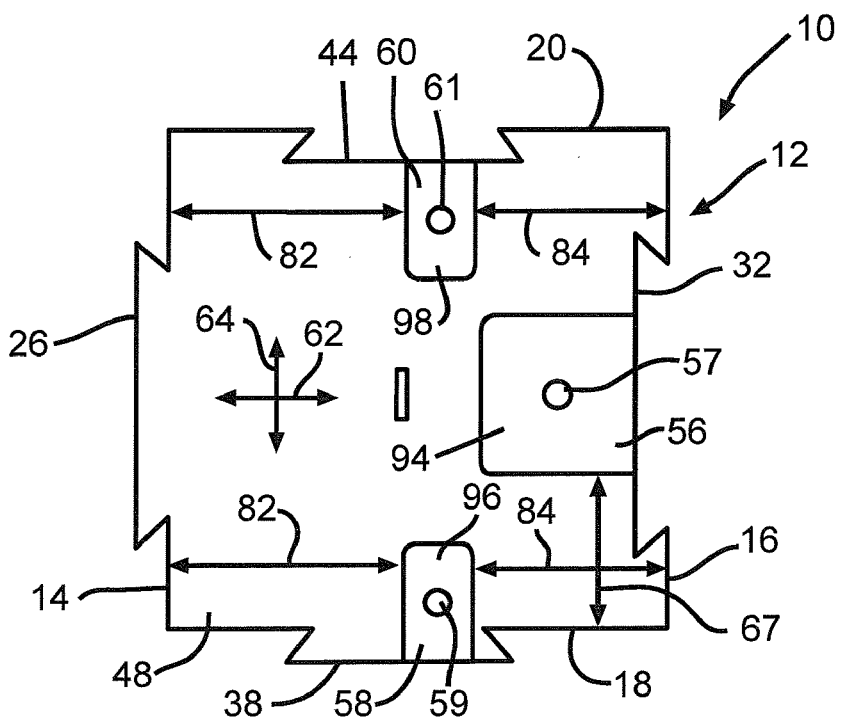
FIG. 1C is a bottom view of the modular battery 10 of FIG. 1.
Figure 2:
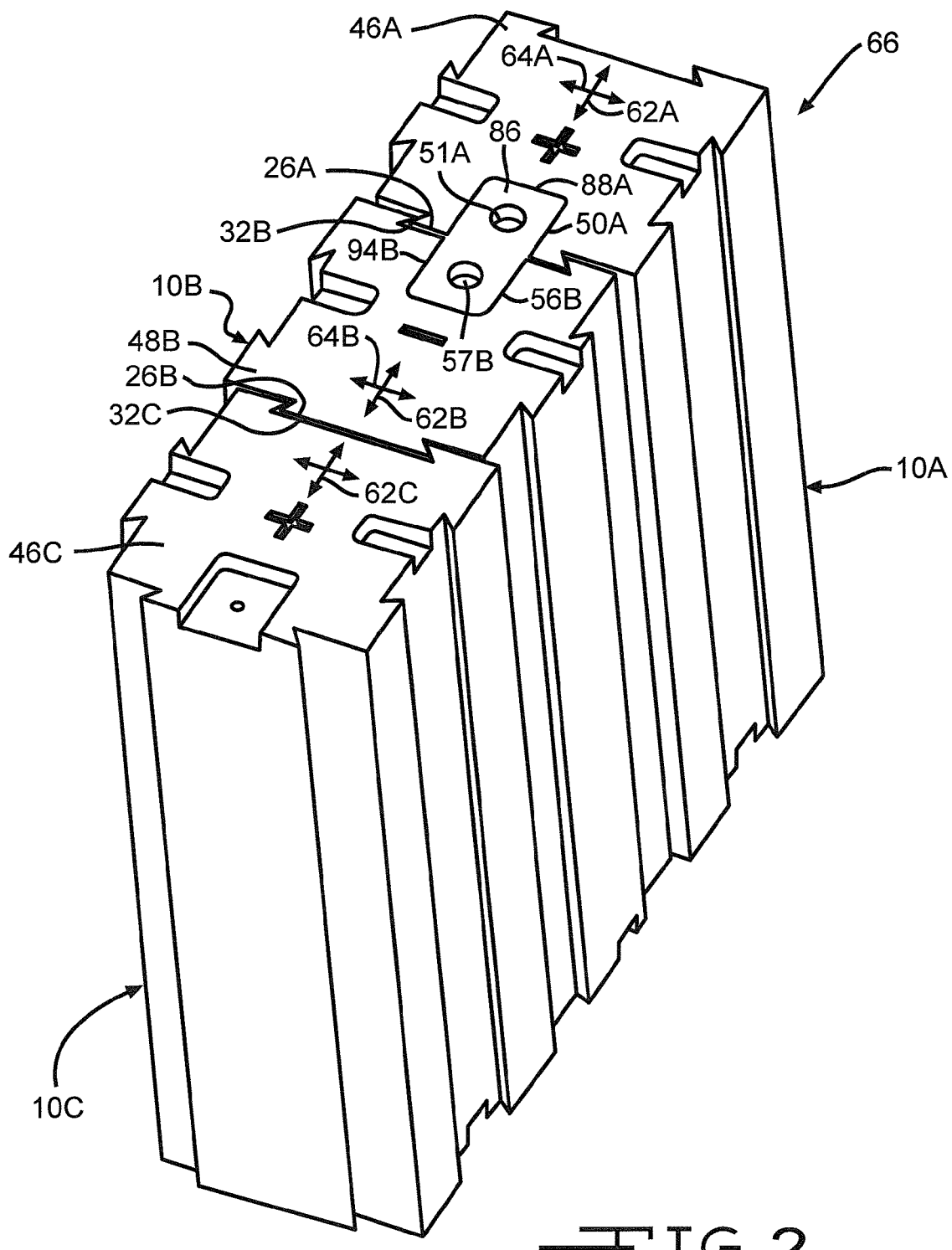
FIG. 2 is an upper perspective view of three modular batteries 10A, 10B, and 10C connected in series.
Figure 2A:
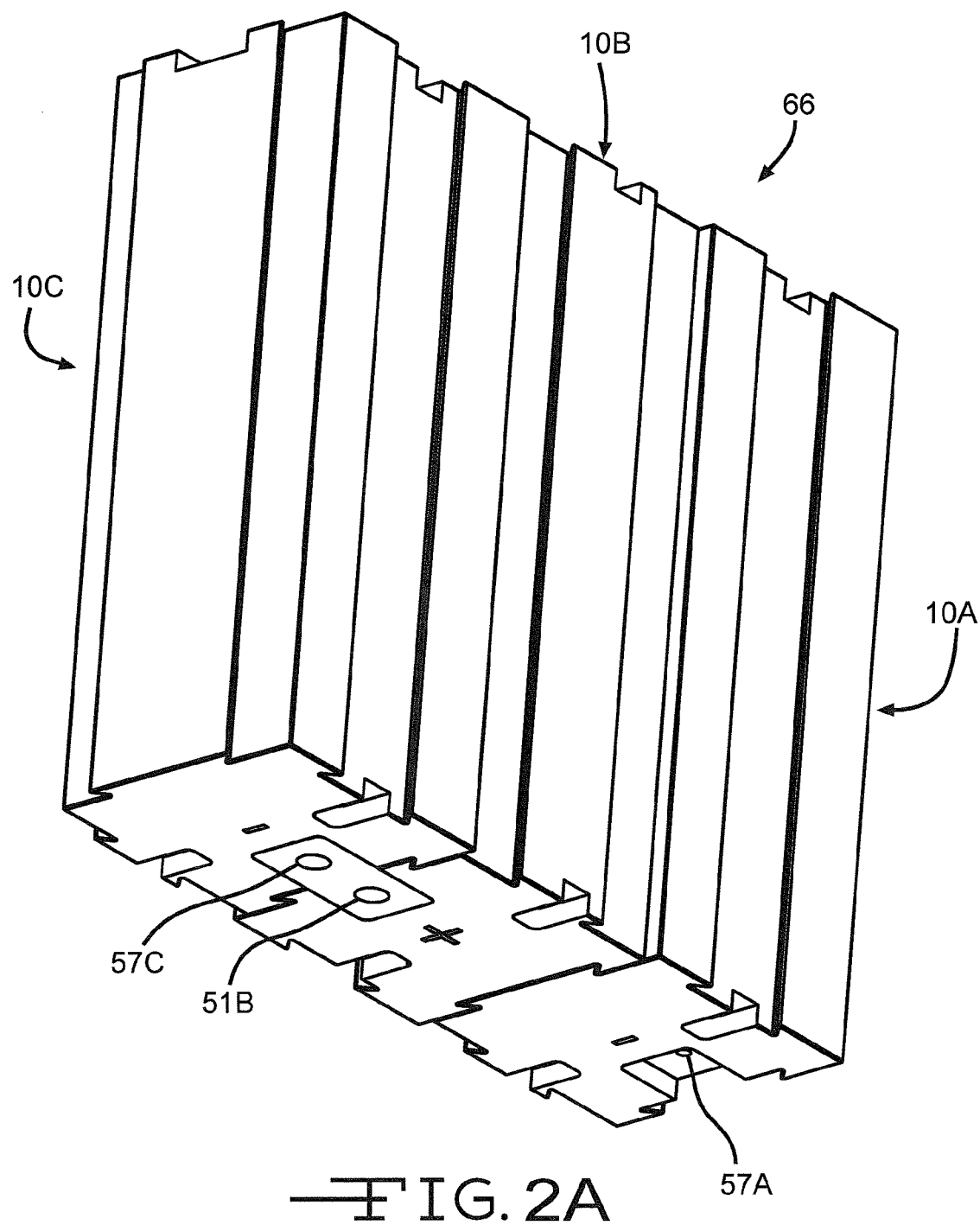
FIG. 2A is a lower perspective view of the three series-connected modular batteries 10A, 10B and 10C of FIG. 2.

FIG. 2 is an upper perspective view of three modular batteries 10A, 10B, and 10C connected in series to form a modular battery pack 66, and FIG. 2A is a lower perspective view of the modular battery pack 66 of FIG. 2. To begin assembling the series battery pack 66, battery 10B is inverted with respect to battery 10A, and batteries 10A and 10B are aligned with each other along their series axes 62A and 62B. The first male key 26A of the first modular battery 10A is then slidingly engaged with the first female key 32B of the second modular battery 10B until the first or upper end wall 46A of the first modular battery 10A is substantially coplanar with the second or lower end wall 48B of the second modular battery 10B. In this position, the first series terminal cavity 50A is aligned with the second series terminal cavity 56B. Referring to battery 10 of FIGS. 1B and 1C, which is representative of batteries 10A and 10B, this alignment occurs because for each of the batteries 10A and 10B, the distance 65 between the first series terminal cavity 50 and the first side wall 18 of the second pair of opposed keyed side walls is equal to the distance 67 between the second series terminal cavity 56 and the first side wall 18 of the second pair of opposed keyed side walls. The first terminal 51A of the first modular battery 10A (which is positive in FIG. 2) is then electrically connected to the fourth terminal 57B of the second modular battery 10B (which is negative in FIG. 2) to make the series connection.

It is noted that the respective matched male and female keys 26A and 32B are depicted in FIGS. 1 to 7 as having a trapezoidal or "dovetail" shape. It is to be understood that other key shapes may be used which will achieve the same result. For example, the male key could have extending rectangular shoulders at its edges, with the matched female key having corresponding rectangular undercuts. As used herein, the term "male key" is meant to indicate a protuberance which includes overhanging structures at its edges, and the term "female key" is meant to indicate a cavity which includes undercut structures at its edges which match the overhanging structures of the corresponding male key.

At this point, a series modular battery pack is formed which includes two modular batteries. The fourth terminal 57A of the first modular battery 10A and the first terminal 51B of the second modular battery 10B are available for connection to a load to be powered, or to additional adjacent modular batteries in series. The keyed sidewall configurations and terminal configurations at the end walls of the batteries prevent making an erroneous connection when assembling them in series.

Referring to FIG. 1B, it can be seen that the width 68 of the first male key 26 (and the corresponding first female key 32) differs from the width 70 of the second male key 38 (and the corresponding second female key 44). Thus, even if a user were to misalign the first battery 10A with the second battery 10B, wherein the series axis 62A of the first battery 10A is aligned with the parallel axis 64B of the second battery, it would not be possible to engage their respective male and female keys together because they are of different shapes and dimensions, and will not engage with each other. Additionally, if the user does not invert the battery 10B with respect to battery 10A in a proper series orientation before engaging male key 26A with female key 32B, then after the keys are fully engaged and the battery end walls are coplanar, it will not be possible to connect their respective series terminals 51A and 57B. This is because the first terminal 51A of modular battery 10A and the fourth terminal 57B of modular battery 10B will not be proximate to each other, and their respective terminal cavities 50A and 56B will not be aligned. Instead, the fourth terminal 57B will be on the bottom side of the battery pack 66.

To complete the three-battery series battery pack 66 of FIGS. 2 and 2A, modular battery 10C is oriented with its first end wall 46C up, and the first female key 32C of battery 10C is engaged with the first male key 26B of battery 10B. The first terminal 51B of the second modular battery 10B is then electrically connected to the fourth terminal 57C of the third modular battery 10C to make the series connection. The same key and terminal configurations as described for batteries 10A and 10B prevent making an erroneous connection between batteries 10B and 10C.

Figure 3:
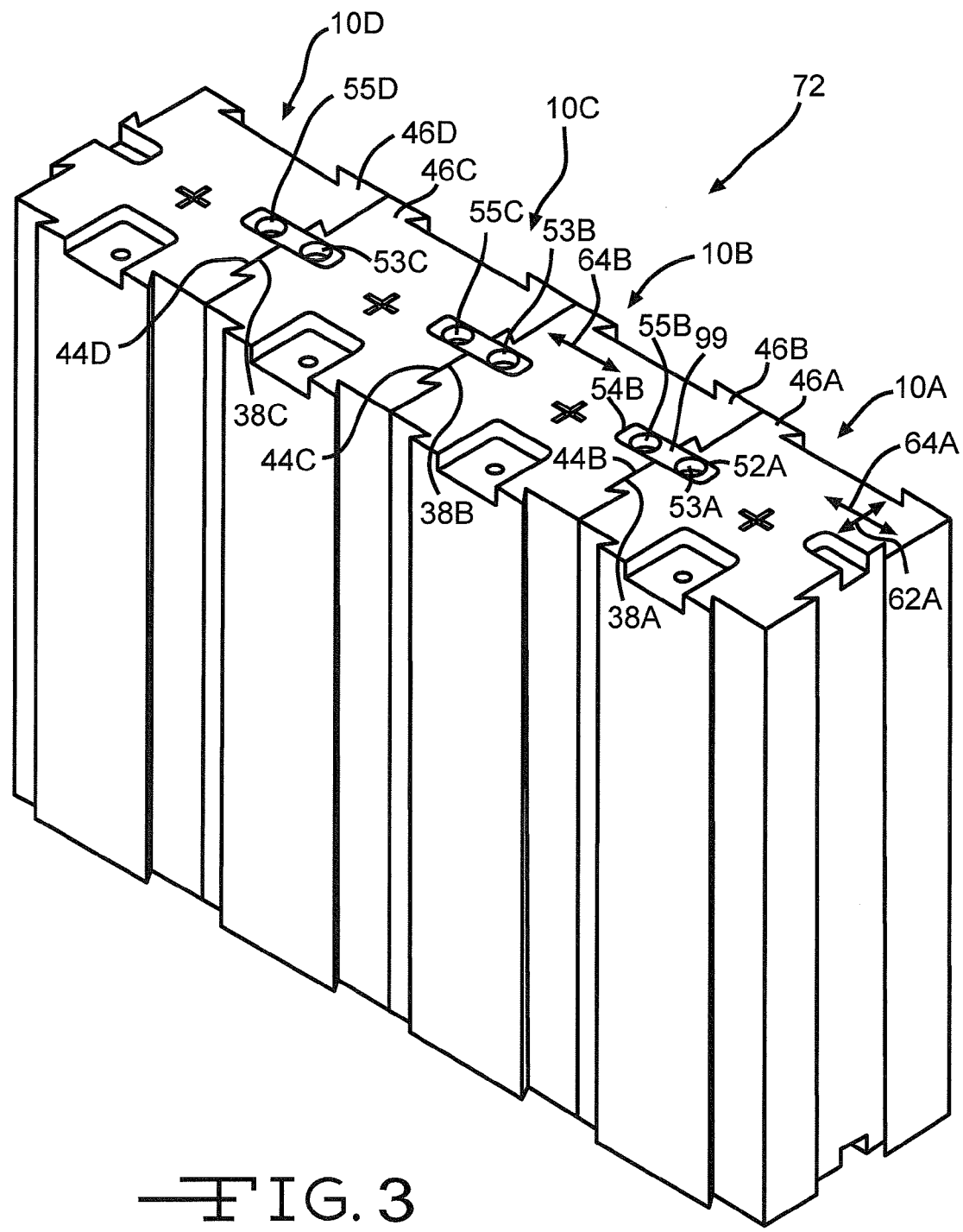
FIG. 3 is an upper perspective view of four modular batteries 10A, 10B, 10C and 10D connected in parallel.
Figure 3A:
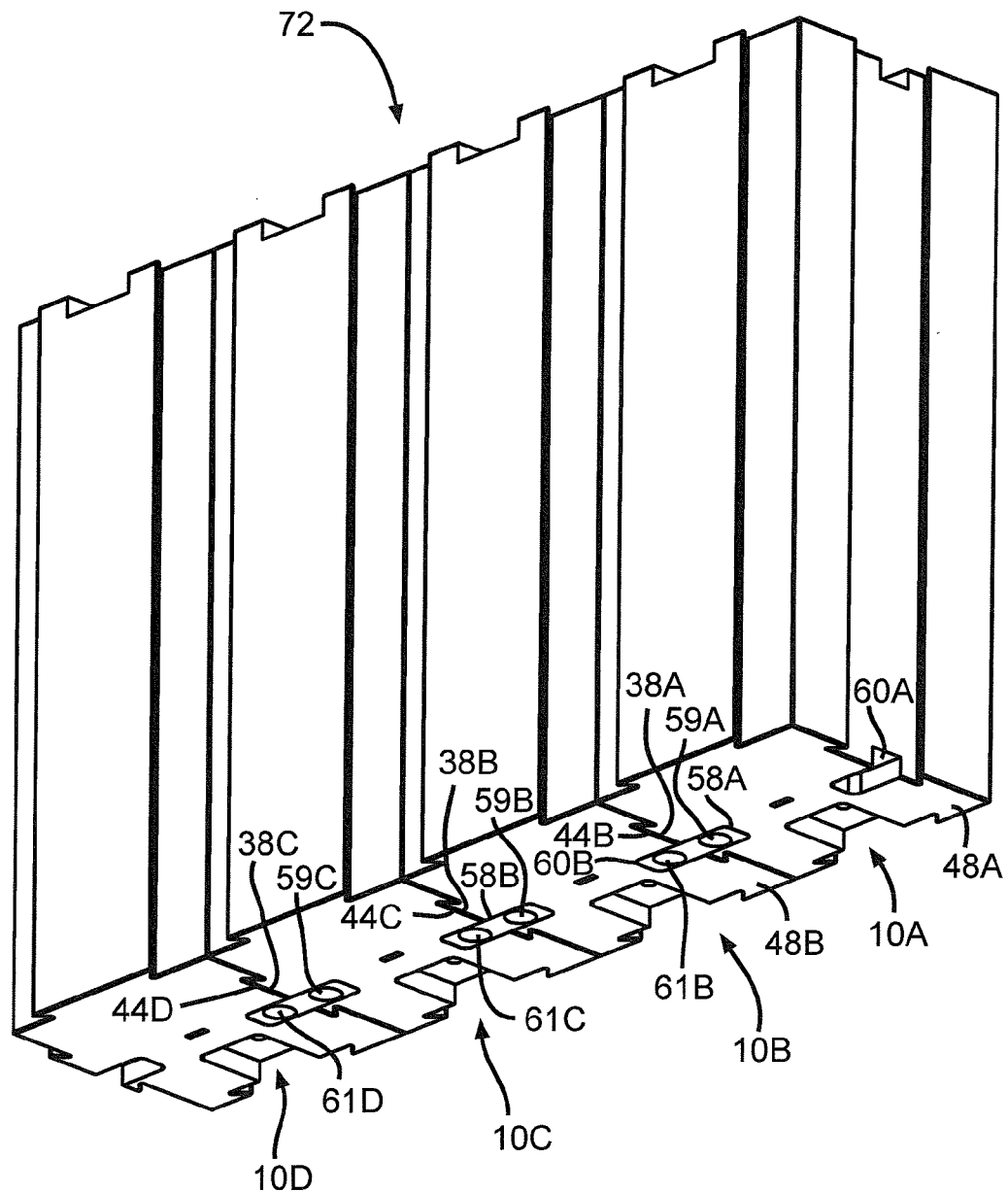
FIG. 3A is a lower perspective view of the four parallel-connected modular batteries 10A, 10B, 10C and 10D of FIG. 3.

FIG. 3 is an upper perspective view of four modular batteries 10A, 10B, 10C, and 10D connected in parallel to form a modular battery pack 72, and FIG. 3A is a lower perspective view of the modular battery pack 72 of FIG. 3. To begin assembling the parallel battery pack 72, batteries 10A and 10B are aligned with each other along their parallel axes 64A and 64B. The second male key 38A of the first modular battery 10A is then slidingly engaged with the second female key 44B of the second modular battery 10B until the first end wall 46A of the first modular battery 10A is substantially coplanar with the first end wall 46B of the second modular battery 10B. In this position, the first parallel terminal cavity 52A is aligned with the second parallel terminal cavity 54B, and the third parallel terminal cavity 58A is aligned with the second parallel terminal cavity 60B. The second terminal 53A of the first modular battery 10A is electrically connected to the third terminal 55B of the second modular battery 10B, and the fifth terminal 59A of the first modular battery 10A is electrically connected to the sixth terminal 61B of the second modular battery 10B to make the parallel connection.

At this point, a parallel modular battery pack is formed which includes two modular batteries. The second terminal 53B of the second modular battery 10B and the fifth terminal 59B of the second modular battery 10B are available for connection to a load to be powered, or to additional adjacent modular batteries in parallel. Again, the keyed sidewall configurations and terminal configurations at the end walls of the batteries prevent making an erroneous connection when assembling them in parallel. One aspect of the error prevention is the difference in size and/or shape between the first male key 26 and corresponding first female key 32, and the second male key 38 and corresponding second female key 44, which have been described previously herein.

A second aspect of the error prevention is the positioning of the parallel terminal cavities on the first and second end walls of the modular batteries 10A and 10B. FIGS. 1B and 1C depict the end walls of a modular battery 10, which is representative of modular batteries 10A-10D of FIGS. 2, 2A, 3, and 3A. Referring to FIG. 1B in particular, the first parallel terminal cavity 52 is offset from a plane perpendicular to the first end wall 46 and passing through the center of the battery in the direction of axis 64. In other words, the distance 74 from the first side wall 14 of the first pair of opposed keyed side walls to the first parallel terminal cavity 52 differs from the distance 76 from the second side wall 16 of the first pair of opposed keyed side walls. Additionally, the second parallel terminal cavity 54 is offset from the center of the battery an equal amount, i.e. distance 78 is equal to distance 74 and distance 80 is equal to distance 76. Thus when the second male key 38A of battery 10A of FIG. 3 is engaged with the second female key 44B (see FIGS. 3 and 3A) with their first ends 46A and 46B aligned with each other, their respective parallel terminal cavities 52A and 54B align with each other.

However, the respective third terminal cavities 58A and 58B and fourth terminal cavities 60A and 60B of batteries 10A and 10B are offset from the central plane of the battery in the same direction, i.e. the terminal distances 82 differ from the distances 84 (see FIG. 1C). Thus, if a user mistakenly inverts battery 10B with respect to battery 10A before engaging the second male key 38A of battery 10A with the second female key 44B of battery 10B, connection of the respective parallel terminals of the batteries 10A and 10B is prevented. This is because when the first end wall 46A of battery 10A is made coplanar with the second end wall 48B of battery 10B and the first end wall 46B of battery 10B is made coplanar with the second end wall 48A of battery 10A, their respective parallel terminal cavities do not align because of their offsets. Therefore, the means for connecting the terminals (to be described subsequently herein) will not fit in the misaligned terminal cavities, and improper connection of the terminals is prevented.

To complete the four-battery parallel battery pack 72 of FIGS. 3 and 3A, modular battery 10C is oriented with its first end wall 46C up, and the second female key 44C of battery 10C is engaged with the second male key 38B of battery 10B. The third terminal 53B and fifth terminal 59B of the second modular battery 10B are then electrically connected to the respective second terminal 55C and sixth terminal 61C of the third modular battery 10C to make the parallel connections between them. Modular battery 10D is then oriented with its first end wall 46D up, and the second female key 44D of battery 10D is engaged with the second male key 38C of battery 10C. The third terminal 53C and fifth terminal 59C of the third modular battery 10C are then electrically connected to the respective second terminal 55D and sixth terminal 61D of the fourth modular battery 10D to make the parallel connections between them. The same key and terminal configurations as described for batteries 10A and 10B prevent making an erroneous connection between batteries 10B, 10C, and 10D.

Figure 4:
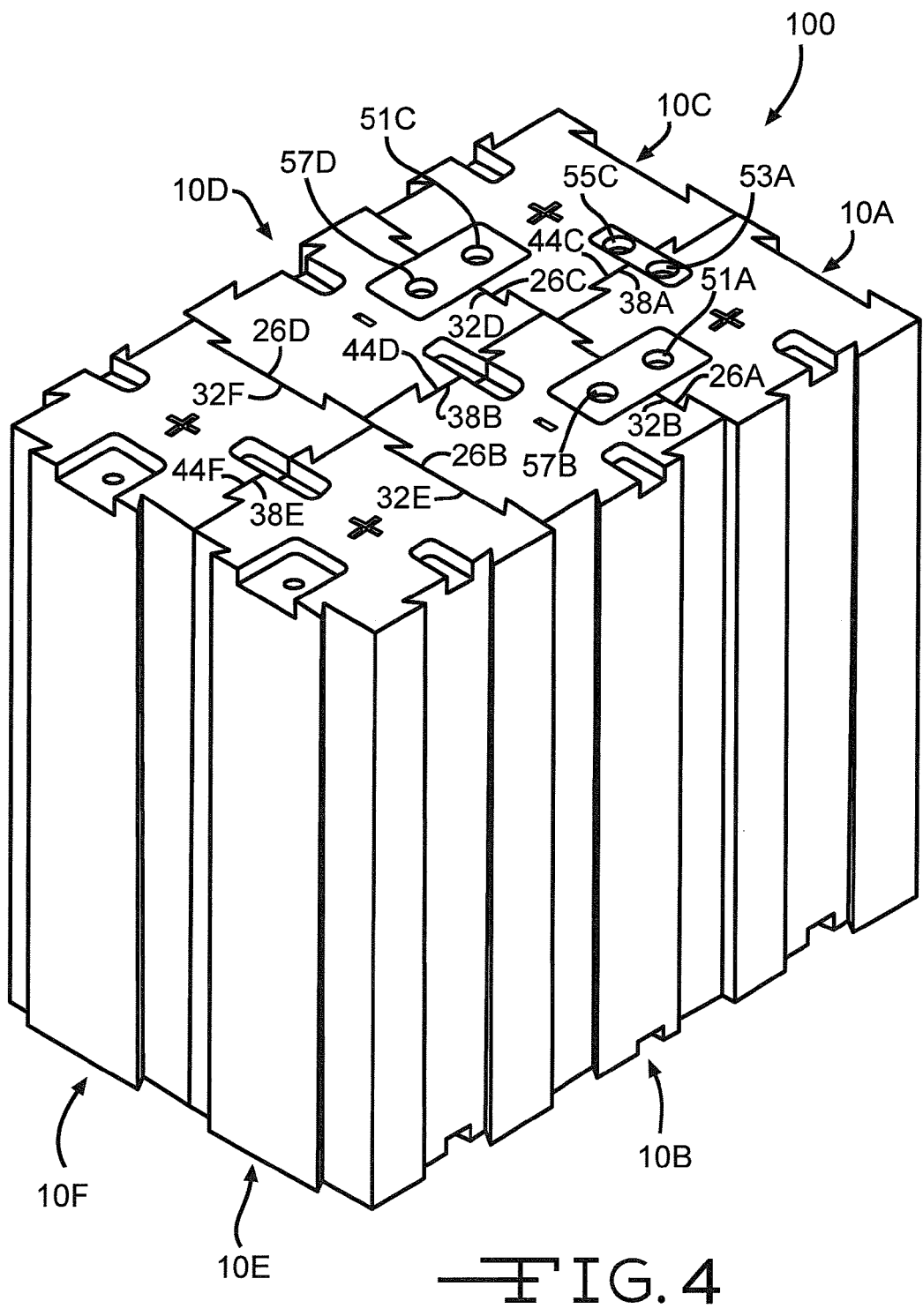
FIG. 4 is an upper perspective view of six modular batteries 10A, 10B, 10C, 10D, 10E and 10F comprising first and second sets of three batteries connected in series, with the first and second sets connected in parallel.
Figure 4A:
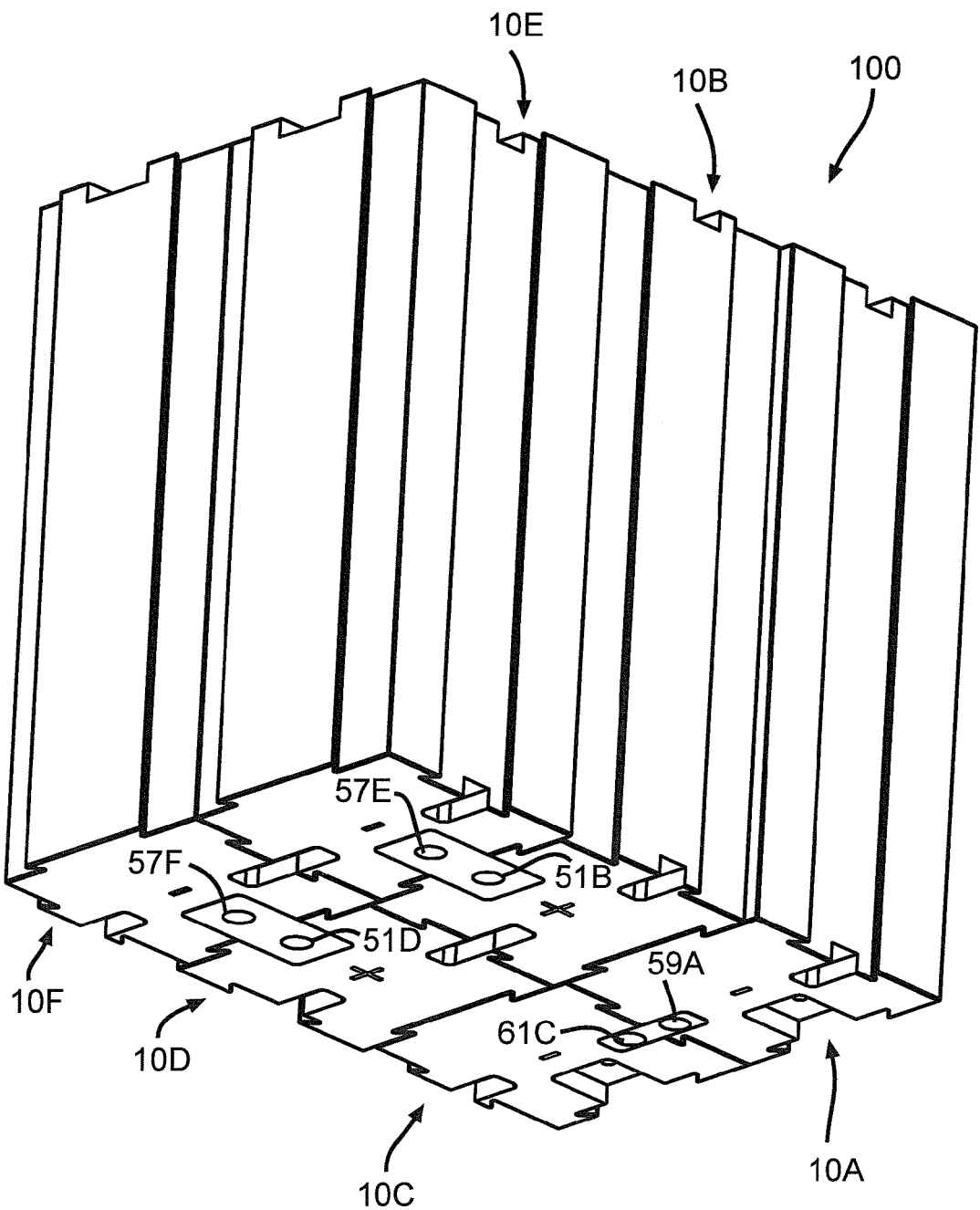
FIG. 4A is a lower perspective view of the six series/parallel-connected modular batteries 10A, 10B, 10C, 10D, 10E and 10F of FIG. 4.

To make the series battery pack 66 of FIG. 2, the parallel battery pack 72 of FIG. 3, or the series-parallel battery pack of FIG. 4, means for connecting the respective terminals of adjacent batteries in series or in parallel in an error-free manner are provided. Referring to FIG. 2, the means for connecting a pair of terminals may comprise a conductive connector bar 86. The conductor bar may be made of a metal, such as copper, brass, aluminum, steel, or stainless steel. For any given series or parallel terminal connection, a conductive connector bar such as bar 86 is connected to a pair of terminals that are made proximate to each other when a pair of modular batteries are placed adjacent to each other in a series or parallel relationship. When conductive connector bars are used, the respective terminal cavities in the end walls of the modular batteries are formed as slots having shapes that correspond to the shapes of the conductor bars.

Referring again to FIGS. 1 and 1B, in the battery 10 depicted therein, the first series terminal cavity 50 is a first slot 88 extending to the first side wall 14 of the first pair of opposed keyed side walls, the first parallel terminal cavity 52 is a second slot 90 extending to the first side wall 18 of the second pair of opposed keyed side walls and the second parallel terminal cavity is a third slot 92 extending to the second side wall 20 of the second pair of opposed keyed side walls. Referring to FIGS. 1A and 1C, the second series terminal cavity 56 is a fourth slot 94 extending to the second side wall 16 of the first pair of opposed keyed side walls; the third parallel terminal cavity 58 is a fifth slot 96 extending to the first side wall 18 of the second pair of opposed keyed side walls; and the fourth parallel terminal cavity 60 is a sixth slot 98 extending to the second side wall 20 of the second pair of opposed keyed side walls.

The slots 88, 90, 92, 94, 96 and 98 are provided with specific shapes, such that when a pair of modular batteries are placed adjacent to each other, and a pair of male and female keys on the casing side walls are engaged with each other as described previously herein, the pair of slots also align with each other, thereby forming a single recessed slot having the same shape as the conductor bar. For example, in FIG. 2, slot 88A of battery 10A and slot 94B of battery 10B are aligned with each other. The conductor bar 86 is then disposed in the combined recessed slot to make the connection between the terminals 51A and 57B. The connection can be made with suitable fasteners such as screws (not shown), which pass through conductor bar 86 and engage with threads in the respective terminals 51A and 57B. Alternatively, terminals 51A and 57B may be provided with conductive posts (not shown) that extend outwardly therefrom, and the conductor bar 86 may be engaged with these posts.

The slots may be provided with two different shapes, one shape for series connection and one shape for parallel connection. Referring to FIGS. 1B and 1C, slots 88 and 94 are for series connection and are provided in a first width. Slots 90, 92, 96, and 98 are for parallel connections and are provided in a second width. Accordingly, the conductor bars are also provided in two different corresponding shapes. Conductor bar 86 of FIG. 2 is provided in a first width to match series slots 88 and 94, and conductor bar 99 of FIG. 3 is provided in a second width to match parallel slots 90, 92, 96, and 98. As described previously herein for terminal cavities in general, the slots 88, 90, 92, 94, 96 and 98 are located in the respective end walls in specific positions so that it is not possible to make a short-circuit connection between adjacent modular batteries.

Alternatively the connections between terminals can be made with resistance welded nickel or stainless steel tabs, typically the tab thickness would be less than 0.010". Insulated wires when the space allowed becomes restrictive and modules cannot be connected by the intimate contact method. This will allow modules for instance to be connected at right angles to each other. Methods of attaching said insulative leads are solder, screws or snap-type fasteners.

To make a series and parallel connection between groups of modular batteries, a first set of two or more series-connected batteries is connected in parallel to a second set of two or more series-connected batteries. FIG. 4 is an upper perspective view of six modular batteries 10A, 10B, 10C, 10D, 10E, and 10F comprising first and second sets of three batteries connected in series, with the first and second sets connected in parallel to form a modular battery pack 100. To begin assembling the battery pack 100, batteries 10A and 10B are connected in series as described previously herein. The first male key 26A of battery 10A is engaged with the first female key 32B of battery 10B, and the first terminal 51A of battery 10A is electrically connected to the fourth terminal 57B of battery 10B. Batteries 10C and 10D may then be connected in series. The first male key 26C of battery 10C is engaged with the first female key 32D of battery 10D, and the first terminal 51C of battery 10C is electrically connected to the fourth terminal 57D of battery 10D.

The pairs of series-connected batteries 10A/10B and 10C/10D may then be connected in parallel. The second male key 38A of the first battery 10A is engaged with the second female key 44C of the third battery 10C, and the second female key 38B of the second battery 10B is engaged with the second male key 44D of the fourth battery 10D. The second terminal 53A of the first battery 10A is electrically connected to the third terminal 55C of the third modular battery 10C, and the fifth terminal 59A of the first battery 10A is electrically connected to the sixth terminal 61C of the third battery 10C. At this point, a series-parallel modular battery pack is formed which includes four modular batteries 10A, 10B, 10C and 10D.

To complete the six-battery pack 100, the fifth modular battery 10E may be connected to the sixth modular battery 10F in parallel as described herein, and then the parallel battery pack 10E/10F may be connected to the battery pack comprised of batteries 10A, 10B, 10C and 10D. The first male key 26B of the second battery 10B is engaged with the first female key 32E of the fifth battery 10E, and the first terminal 51B of the second battery 10B is electrically connected to the fourth terminal 57E of the fifth battery 10E, thereby forming a series connection between the second battery 10B and the fifth battery 10E. The first male key 26D of the fourth battery 10D is engaged with the first female key 32F of the sixth battery 10F, and the first terminal 51D of the fourth battery 10D is electrically connected to the fourth terminal 57F of the sixth battery 10F, thereby forming a series connection between the fourth battery 10D and the sixth battery 10F. Additionally, the second male key 38E of the fifth battery 10E is engaged with the second female key 44F of the sixth battery 10F.

It will be apparent that the series-parallel battery pack 100 of FIG. 4 may be assembled in a different order than described above. For example, a first pair of batteries 10A and 10C may be connected in parallel, a second pair of batteries 10B and 10D may be connected in parallel, and then those pairs of batteries may be connected in series. A third pair of parallel connected batteries 10E and 10F may then be connected in series to batteries 10A/10B/10C/10D to form the battery pack 100. Alternatively, the series-parallel battery pack 100 may also be connected "one battery at a time," for example, in the order 10A, 10B, 10C, 10D, 10E, and 10F. The unique keyed side walls of the battery casings and end wall terminal cavity configurations enable this to be done in an error-free manner.

The modular battery 10 of FIG. 1 and each of the modular batteries 10A, 10B, 10C, 10D, 10E and 10F of FIGS. 2, 2A, 3, 3A, 4, and 4A may each be comprised of only a first electrode and a second, opposite polarity electrode, i.e. a single anode and a single cathode of one electrochemical cell. Alternatively, the batteries 10, 10B, 10C, 10D, 10E and 10F may include multiple pairs of opposite polarity electrodes, or they may be formed as battery packs comprised of individual battery cells connected to each other and contained within the keyed battery casing. In such an instance, the battery pack may be comprised of a first cell and a second cell, wherein the first and second cells are connected to each other.

Figure 5:
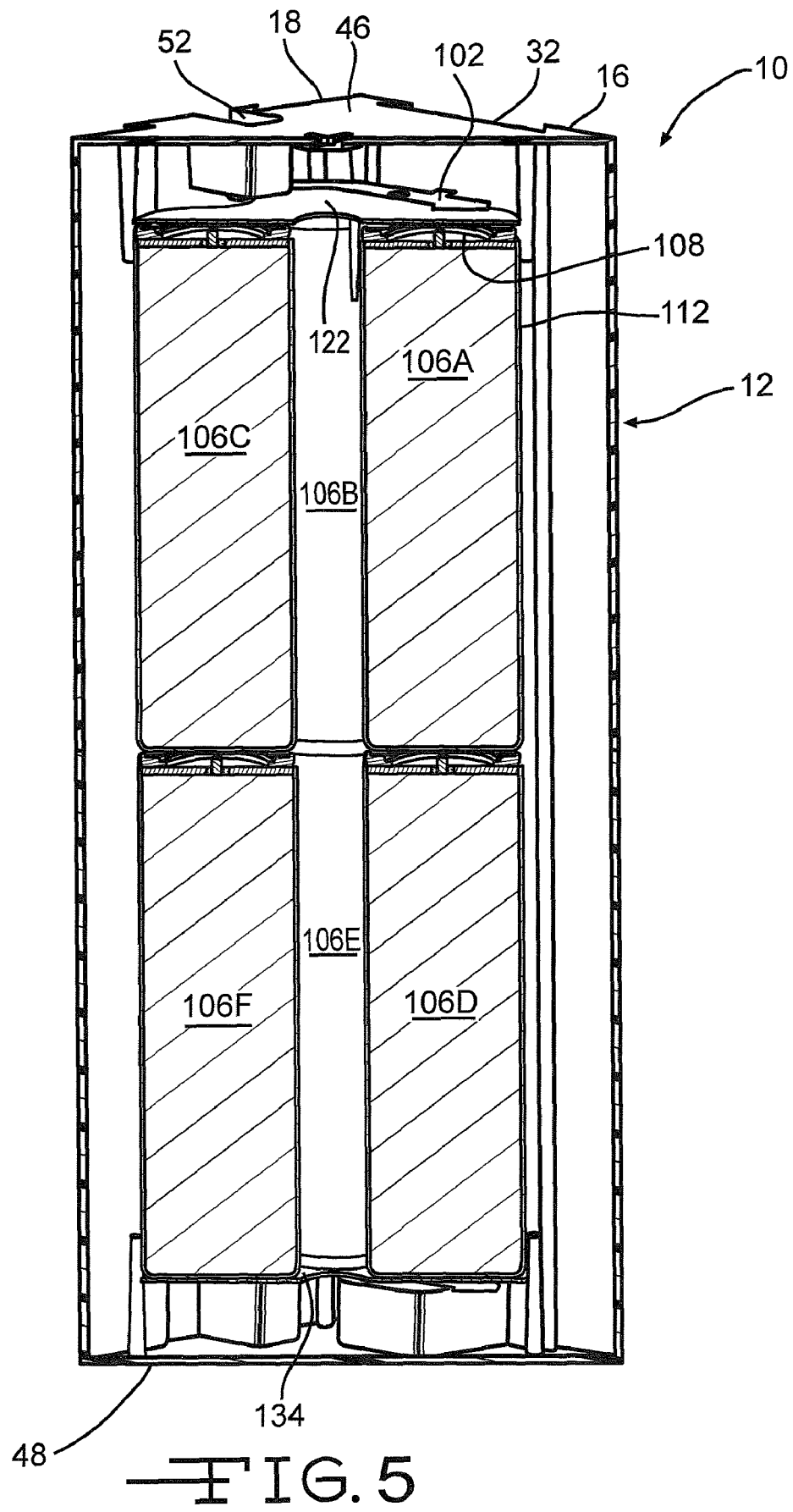
FIG. 5 is a side cross-sectional view of one internal configuration of a modular battery 10, taken diagonally across the casing 12 along the line 5-5 of FIG. 1.
Figure 6:
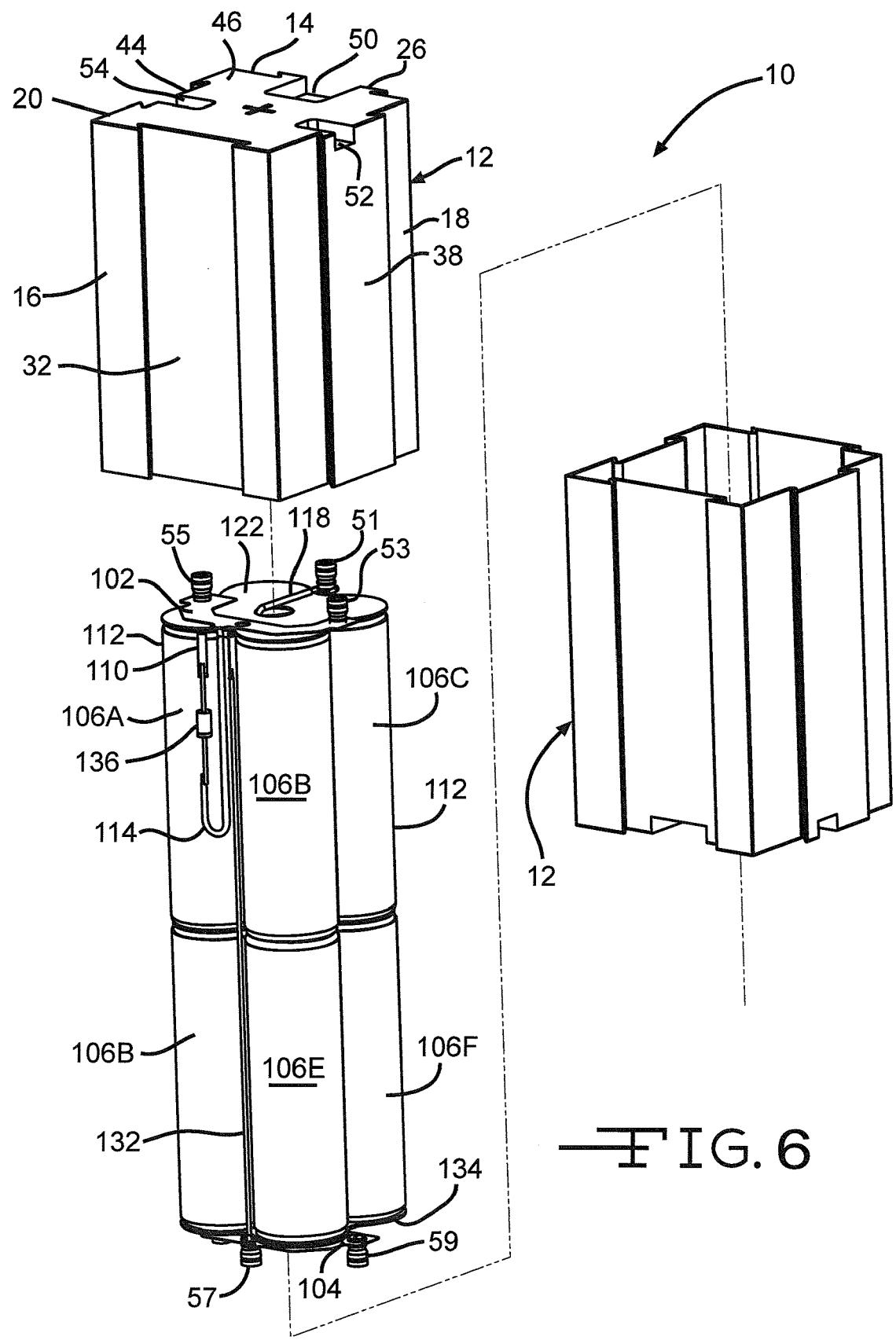
FIG. 6 is a perspective view of the internal configuration of the battery 10 of FIG. 5, taken in the opposite horizontal direction of the view of FIG. 5.
Figure 7:
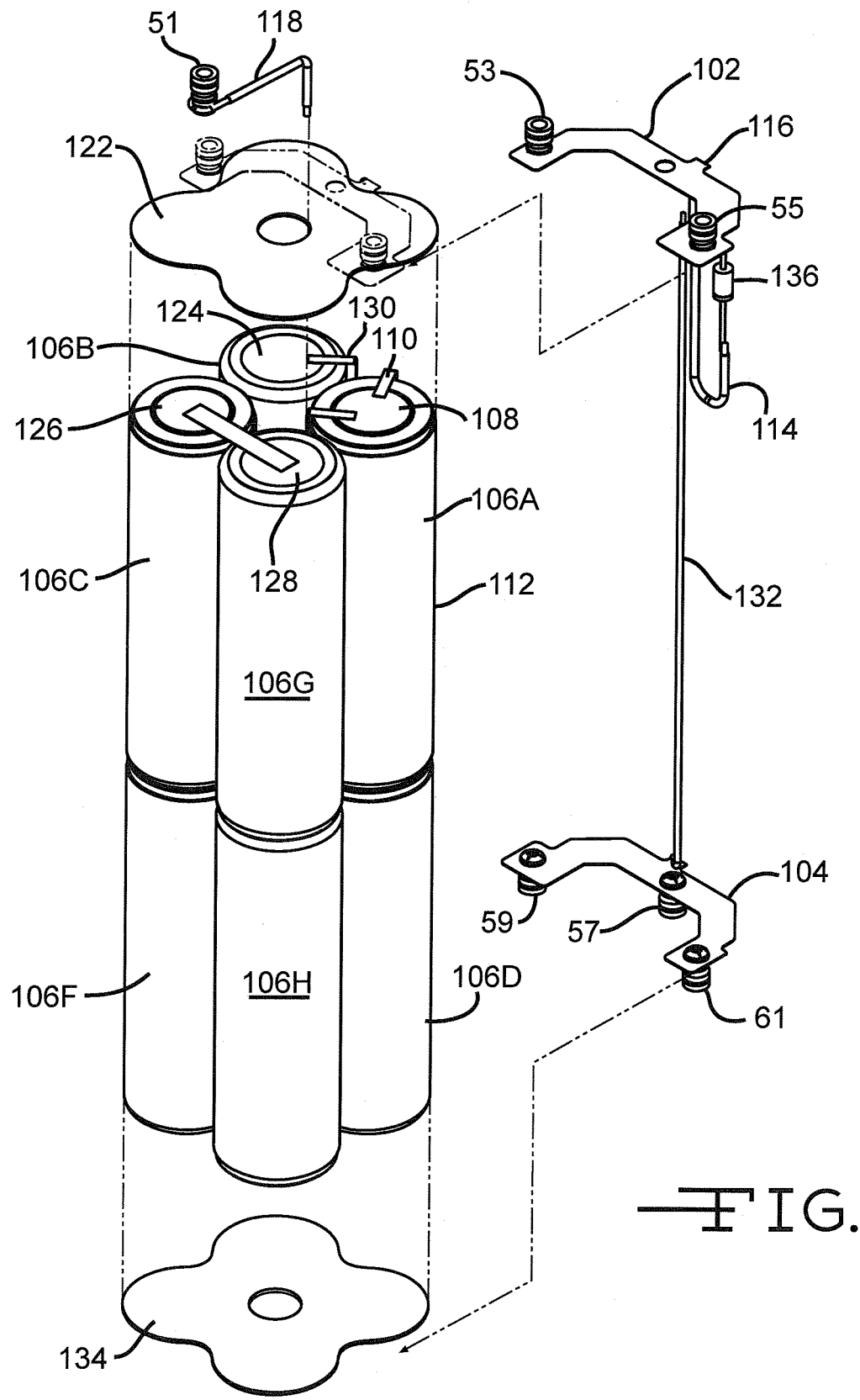
FIG. 7 is an exploded view of the internal configuration of the battery 10 of FIG. 5 depicting the terminal connections within the battery.

FIGS. 5, 6 and 7 depict the internal electrical connections between the terminals at the first end of a modular battery and the first electrode of a first electrochemical cell, and the terminals at the second end of the modular battery and the second, opposite polarity electrode of a different electrochemical cell. Within the casing 12 of the modular battery 10, first and second conductive terminal members 102 and 104 are provided for connection to the opposite polarity electrodes of the respective cells. Referring also to FIGS. 1B and 1C, the first conductive terminal member 102 is in electrical contact with the first electrode of the first cell and with the first terminal 51 at the first series terminal cavity 50, the second terminal 53 at the first parallel terminal cavity 52, and the third terminal 55 at the second parallel terminal cavity 54. The second conductive terminal member 104 is in electrical contact with the second, opposite polarity electrode of the other cell and with the fourth terminal 57 at the second series terminal cavity 56, the fifth terminal 59 at the third parallel terminal cavity 58, and the sixth terminal 61 at the fourth parallel terminal cavity 60.

In one embodiment (not shown), the modular battery 10 may be comprised of a single cell including a single anode and cathode. The cathode may be connected or in direct contact with the first conductive terminal member 102, and the anode may be connected or in direct contact with the second conductive terminal member 104. In other embodiments, the modular battery may further include additional cells connected in series and/or in parallel to each other and to the opposite polarity first and second electrodes. The battery may be a "dry cell," or the battery may include a liquid electrolyte.

The electrodes may be configured in anode-cathode pairs and may be contained in individual casings formed as cells within the main casing. The modular battery may be formed as a battery pack comprised of individual battery cells connected to each other and contained within the keyed battery casing. Such a battery pack may be comprised of a first cell having an electrode of a first polarity connected to the first conductive terminal member 102, and a second cell having an electrode of a second, opposite polarity connected to the second conductive terminal member 104, wherein the first cell and the second cell are connected to each other.

The battery 10 of FIGS. 5 to 7 is provided with eight individual cells 106A, 106B, 106C, 106D, 106E, 106F, 106G and 106H. Each of the cells 106A to 106H is comprised of a casing and a first conductive end connected to a first electrode within the casing and a second, opposite polarity conductive end connected to a second electrode within the casing. Cell 106A includes a first conductive end 108 that is connected to the first electrode thereof (not shown), and to the first conductive member 102. This latter connection is made through a first conductive tab 110, which is in contact with the conductive end 108 of cell 106A, and which is bent at a perpendicular angle and extends downwardly along the casing 112 of cell 106A. A U-shaped wire lead 114 is connected to this tab 110, and to a second conductive tab 116 that also extends downwardly from the first conductive terminal member 102 along the casing 112 of cell 106A.

The second terminal 53 and the third terminal 55 may be attached directly to the first conductive member 102, which may be formed from stamped sheet metal, such as copper, brass, steel, stainless steel, titanium, or aluminum. Since the first terminal 51 is on the opposite side of the battery from the first conductive member 102, it is connected to the member 102 by a conductive tab or wire lead 118. In the battery 10 of FIGS. 5 to 7, the wire lead 118 is connected to a third conductive tab 120, which extends upwardly along the casing 112 of cell 106A and is in contact with the conductive end 108 of that cell 106A. The connection to the first conductive member 102 is then completed through the first conductive tab 110, U-shaped lead 114, and the second conductive tab 116 as described previously. Alternatively, the first conductive member 102 could extend the remaining distance around the battery 10 above cells 106C and 106G, and terminal 51 could be attached directly to the member 102.

An insulator 122 is disposed between the first conductive member 102 and the conductive ends 108, 124, 126, and 128 of the respective cells 106A, 106B, 106C, and 106G to prevent an undesired connection of the these cells to each other through the first conductive member 102. The insulator may be made of a thin sheet of plastic such as polyethylene, polypropylene, poly vinyl chloride (PVC), reinforced fishpaper or high dielectric strength insulative tape such as that commercially available from Du Pont under the trademark Kapton®.

With regard to the battery connections of the opposite polarities, the conductive end 124 of cell 106B is connected to the second conductive member 104. This connection is made through a fourth conductive tab 130, which is in contact with the conductive end 124 of cell 106B. The tab 130 is bent at a perpendicular angle and extends downwardly along the casing 112 of cell 106B. A wire lead 132 is connected to this tab 130, and to the second conductive terminal member 104. The fourth terminal 57, fifth terminal 59, and sixth terminal 61 may be attached directly to the second conductive member 104. An insulator 134 is disposed between the second conductive member 104 and the conductive ends of the cells 106D, 106E, 106F, and 106H to prevent an undesired connection of the these cells to each other through the second conductive member 104.

EXAMPLE

One modular battery 10 as shown in FIGS. 5 to 7 may include a set of eight lithium-ion manganese batteries each having a length of about 65 millimeters, a diameter of about 18 millimeters, and a nominal voltage of about 3.6 volts. The batteries may be configured as two parallel-connected sets of four batteries in series, thereby producing a battery pack of about 14.4 volts. The battery pack may be provided as a modular battery pack contained in a keyed casing 12 as described herein having a side wall width of about 40 millimeters and a height of about 150 millimeters. The battery 10 may further include an internal circuit protection device 136 such as a fuse or other circuit interrupt device to prevent high current surges.

It is, therefore, apparent that there has been provided, in accordance with the present invention, a modular battery and modular battery packs comprised of multiples of the modular battery connected to each other in series and/or parallel combinations. While this invention has been described in conjunction with preferred embodiments thereof, it is evident that many alternatives, modifications, and variations will be apparent to those skilled in the art. Accordingly, the present invention is intended to embrace all such alternatives, modifications and variations that fall within the broad scope of the appended claims.

What is claimed is:

1. A modular battery comprising a casing containing a first electrode of a first polarity, and a second electrode of a second polarity, the casing comprised of:

a) a first pair of opposed keyed side walls, wherein a first side wall of the first pair includes an upper end, a lower end, and a first male key, and a second side wall of the first pair includes an upper end, a lower end, and a first female key matched to the first male key; and b) a second pair of opposed keyed side walls, wherein a first side wall of the second pair includes an upper end, a lower end, and a second male key, and a second side wall of the second pair includes an upper end, a lower end, and a second female key matched to the second male key, c) wherein the first male key is sized to only mate with the first female key and the second male key is sized to only mate with the second female key, and
d) a first end wall including:
   i) a first parallel terminal cavity proximate to the upper end of the first side wall of the second pair of opposed keyed side walls;
   ii) a second parallel terminal cavity proximate to the upper end of the second side wall of the second pair of opposed keyed side walls; and
   iii) a first series terminal cavity proximate to the upper end of the first side wall of the first pair of opposed keyed side walls;
   iv) wherein the first series terminal cavity is opposite the first female key and extends into the first male key; and
   v) wherein the first parallel terminal cavity extends into the second male key and the second parallel terminal cavity extends into the second female key; and
e) a second end wall including:
   i) a third parallel terminal cavity proximate to the lower end of the first side wall of the second pair of opposed keyed side walls;
   ii) a fourth parallel terminal cavity proximate to the lower end of the second side wall of the second pair of opposed keyed side walls; and
   iii) a second series terminal cavity proximate to the lower end of the second side wall of the first pair of opposed keyed side walls; and
   iv) wherein the second series terminal cavity is opposite the first male key and extends into the first female key; and
   v) wherein the third parallel terminal cavity extends into the second male key and the fourth parallel terminal cavity extends into the second female key;
f) such that one of the mating first male and female keys and the mating second male and female keys provides for connecting at least two battery casings in a parallel electrical configuration and the other of the mating first and second male and female keys provides for connecting the at least two battery casings in a series electrical configuration.

2. The modular battery of claim 1 wherein:
   i) the first series terminal cavity is a first slot extending to the first side wall of the first pair of opposed keyed side walls;
   ii) the first parallel terminal cavity is a second slot extending to the first side wall of the second pair of opposed keyed side walls;
   iii) the second parallel terminal cavity is a third slot extending to the second side wall of the second pair of opposed keyed side walls;
   iv) the second series terminal cavity is a fourth slot extending to the second side wall of the first pair of opposed keyed side walls;
   v) the third parallel terminal cavity is a fifth slot extending to the first side wall of the second pair of opposed keyed side walls; and
   vi) the fourth parallel terminal cavity is a sixth slot extending to the second side wall of the second pair of opposed keyed side walls.

3. The modular battery of claim 2 wherein the first and fourth slots are of equal width and are equidistant from the first side wall of the second pair of opposed keyed side walls.

4. The modular battery of claim 2 wherein the second and third slots are of equal width, and are each disposed a first distance from the first side wall of the first pair of opposed keyed side walls, and are each disposed a second distance from the second side wall of the first pair of opposed keyed side walls, the first distance being unequal to the second distance; and
wherein the fifth and sixth slots are of equal width, and are each disposed a third distance from the first side wall of the first pair of opposed keyed side walls, and are each disposed a fourth distance from the second side wall of the first pair of opposed keyed side walls, the third distance being unequal to the fourth distance.

5. The modular battery of claim 1 further comprising:
a) a first conductive terminal member in electrical contact with the first electrode and with a first terminal at the first series terminal cavity, a second terminal at the first parallel terminal cavity, and a third terminal at the second parallel terminal cavity; and
b) a second conductive terminal member in electrical contact with the second, opposite electrode and with a fourth terminal at the second series terminal cavity, a fifth terminal at the third parallel terminal cavity, and a sixth terminal at the fourth parallel terminal cavity.

6. The modular battery of claim 5 further comprising a first cell including the first electrode, and a second cell including the second, opposite electrode, wherein the first and second cells are connected to each other.

7. A modular battery pack comprised of at least a first and a second modular batteries connected to each other, each of the modular batteries comprising a casing containing a first electrode of a first polarity, and a second electrode of a second, opposite polarity, the casing of each of the first and second modular batteries comprised of:
a) a first pair of opposed keyed side walls, wherein a first side wall of the first pair includes an upper end, a lower end, and a first male key, and a second side wall of the first pair includes an upper end, a lower end, and a first female key matched to the first male key;
b) a second pair of opposed keyed side walls, wherein a first side wall of the second pair includes an upper end, a lower end, and a second male key, and a second side wall of the second pair includes an upper end, a lower end, and a second female key matched to the second male key, and wherein the first male key is sized to only mate with the first female key and the second male key is sized to only mate with the second female key;
c) wherein one of the mating first male and female keys and the mating second male and female keys provides for connecting at least two battery casings in a parallel electrical configuration and the other of the mating first and second male and female keys provides for connecting the at least two battery casings in a series electrical configuration;
d) a first end wall including a first series terminal cavity proximate to the upper end of the first side wall of the first pair of opposed keyed side walls, a first parallel terminal cavity proximate to the upper end of the first side wall of the second pair of opposed keyed side walls, and a second parallel terminal cavity proximate to the upper end of the second side wall of the second pair of opposed keyed side walls, wherein the first series terminal cavity is intermediate the first and second parallel terminal cavities in the first end wall; and
e) a second end wall including a second series terminal cavity proximate to the lower end of the second side wall of the first pair of opposed keyed side walls, a third parallel terminal cavity proximate to the lower end of the first side wall of the second pair of opposed keyed side walls, and a fourth parallel terminal cavity proximate to the lower end of the second side wall of the second pair of opposed keyed side walls, wherein the first series terminal cavity is intermediate the first and second parallel terminal cavities in the first end wall.

8. The modular battery pack of claim 7 wherein each of the modular batteries further comprises:
   a) a first conductive terminal member in electrical contact with the first electrode and with a first terminal at the first series terminal cavity, second terminal at the first parallel terminal cavity, and a third terminal at the second parallel terminal cavity; and
   b) a second conductive terminal member in electrical contact with the second, opposite electrode and with a fourth terminal at the second series terminal cavity, a fifth terminal at the third parallel terminal cavity, and a sixth terminal at the fourth parallel terminal cavity.

9. The modular battery pack of claim 8 wherein with the first and second modular batteries in a series connection, the first male key of the first modular battery is engaged with the first female key of the second modular battery, and the first terminal of the first modular battery is electrically connected to the fourth terminal of the second modular battery.

10. The modular battery pack of claim 8 wherein with the first and second modular batteries in a parallel connection, the second male key of the first modular battery is engaged with the second female key of the second modular battery, the second terminal of the first modular battery is electrically connected to the third terminal of the second modular battery, and the fifth terminal of the first modular battery is electrically connected to the sixth terminal of the second modular battery.

11. The modular battery pack of claim 8 wherein for each of the modular batteries,
   i) the first series terminal cavity is a first slot extending to the first side wall of the first pair of opposed keyed side walls;
   ii) the first parallel terminal cavity is a second slot extending to the first side wall of the second pair of opposed keyed side walls;
   iii) the second parallel terminal cavity is a third slot extending to the second side wall of the second pair of opposed keyed side walls;
   iv) the second series terminal cavity is a fourth slot extending to the second side wall of the first pair of opposed keyed side walls;
   v) the third parallel terminal cavity is a fifth slot extending to the first side wall of the second pair of opposed keyed side walls; and
   vi) the fourth parallel terminal cavity is a sixth slot extending to the second side wall of the second pair of opposed keyed side walls.

12. The modular battery pack of claim 11 wherein for each of the modular batteries, the first and fourth slots are of equal width and are both equidistant from the first side wall of the second pair of opposed keyed side walls, and wherein the first male key of the first modular battery is engaged with the first female key of the second modular battery, and the first terminal of the first modular battery is electrically connected to the fourth terminal of the second modular battery by a first conductive bar disposed in the first slot of the first modular battery and the fourth slot of the second modular battery, thereby forming a series connection between the first and second modular batteries.

13. The modular battery pack of claim 11 wherein for each of the modular batteries,
   i) the second and third slots are of equal width, and are each disposed a first distance from the first side wall of the first pair of opposed keyed side walls, and are each disposed a second distance from the second side wall of the first pair of opposed keyed side walls, the first distance being unequal to the second distance; and
   ii) wherein the fifth and sixth slots are of equal width, and are each disposed a third distance from the first side wall of the first pair of opposed keyed side walls, and are each disposed a fourth distance from the second side wall of the first pair of opposed keyed side walls, the third distance being unequal to the fourth distance; and
   iii) wherein the second male key of the first modular battery is engaged with the second female key of the second modular battery, the second terminal of the first modular battery is electrically connected to the third terminal of the second modular battery by a first conductive bar disposed in the second slot of the first modular battery and the third slot of the second modular battery, and the fifth terminal of the first modular battery is electrically connected to the sixth terminal of the second modular battery by a second conductive bar disposed in the fifth slot of the first modular battery and the sixth slot of the second modular battery, thereby forming a parallel connection between the first modular battery and the second modular battery.

14. A modular battery pack comprised of first, second, third, and fourth modular batteries connected to each other, each of the modular batteries comprising:
   a) a casing comprised of
      i) a first pair of opposed keyed side walls, wherein a first side wall of the first pair includes an upper end, a lower end, and a first male key, and a second side wall of the first pair includes an upper end, a lower end, and a first female key matched to the first male key;
      ii) a second pair of opposed keyed side walls, wherein a first side wall of the second pair includes an upper end, a lower end, and a second male key, and a second side wall of the second pair includes an upper end, a lower end, and a second female key matched to the second male key, and wherein the first male key is sized to only mate with the first female key and the second male key is sized to only mate with the second female key, and
      iii) wherein one of the mating first male and female keys and the mating second male and female keys provides for connecting at least two battery casings in a parallel electrical configuration and the other of the mating first and second male and female keys provides for connecting the at least two battery casings in a series electrical configuration;
      iv) a first end wall including a first series terminal cavity proximate to the upper end of the first side wall of the first pair of opposed keyed side walls, a first parallel terminal cavity proximate to the upper end of the first side wall of the second pair of opposed keyed side walls, and a second parallel terminal cavity proximate to the upper end of the second side wall of the second pair of opposed keyed side walls; and
      v) a second end wall including a second series terminal cavity proximate to the lower end of the second side wall of the first pair of opposed keyed side walls, a third parallel terminal cavity proximate to the lower end of the first side wall of the second pair of opposed keyed side walls, and a fourth parallel terminal cavity proximate to the lower end of the second side wall of the second pair of opposed keyed side walls;
   b) a first electrode of a first polarity contained within the casing;

c) a second electrode of a second, opposite polarity contained within the casing;
d) a first conductive terminal member in electrical contact with the first electrode and with a first terminal at the first series terminal cavity, a second terminal at the first parallel terminal cavity, and a third terminal at the second parallel terminal cavity; and
e) a second conductive terminal member in electrical contact with the second, opposite electrode and with a fourth terminal at the second series terminal cavity, a fifth terminal at the third parallel terminal cavity, and a sixth terminal at the fourth parallel terminal cavity;
  i) wherein the first male key of the first modular battery is engaged with the first female key of the second modular battery, and the first terminal of the first modular battery is electrically connected to the fourth terminal of the second modular battery, thereby forming a series connection between the first and second modular batteries;
  ii) wherein the first male key of the third modular battery is engaged with the first female key of the fourth modular battery, and the first terminal of the third modular battery is electrically connected to the fourth terminal of the fourth modular battery, thereby forming a series connection between the third and fourth modular batteries; and
  iii) wherein the second male key of the first modular battery is engaged with the second female key of the third modular battery, the second female key of the second modular battery is engaged with the second male key of the fourth modular battery, the second terminal of the first modular battery is electrically connected to the third terminal of the third modular battery, and the fifth terminal of the first modular battery is electrically connected to the sixth terminal of the third modular battery, thereby forming a parallel connection between the first and second series-connected modular batteries and the third and fourth series-connected modular batteries.

15. The modular battery pack of claim 14 further comprising:
  i) wherein the first male key of the second modular battery is engaged with a first female key of a fifth modular battery, and the first terminal of the second modular battery is electrically connected to a fourth terminal of the fifth modular battery, thereby forming a series connection between the second and fifth modular batteries;
  ii) wherein the first male key of the fourth modular battery is engaged with a first female key of a sixth modular battery, and the first terminal of the fourth modular battery is electrically connected to a fourth terminal of the sixth modular battery, thereby forming a series connection between the fourth and sixth modular batteries; and
  iii) wherein the second male key of the fifth modular battery is engaged with the second female key of the sixth modular battery.

16. A method for making a modular battery pack, the method comprising:
a) providing a plurality of modular batteries, each of the modular batteries comprising:
  i) a casing comprised of:
    a first pair of opposed keyed side walls, wherein a first side wall of the first pair includes an upper end, a lower end, and a first male key, and a second side wall of the first pair includes an upper end, a lower end, and a first female key matched to the first male key;
    a second pair of opposed keyed side walls, wherein a first side wall of the second pair includes an upper end, a lower end, and a second male key, and a second side wall of the second pair includes an upper end, a lower end, and a second female key matched to the second male key, and wherein the first male key is sized to only mate with the first female key and the second male key is sized to only mate with the second female key, and wherein one of the mating first male and female keys and the mating second male and female keys provides for connecting at least two battery casings in a parallel electrical configuration and the other of the mating first and second male and female keys provides for connecting the at least two battery casings in a series electrical configuration;
    a first end wall including a first series terminal cavity proximate to the upper end of the first side wall of the first pair of opposed keyed side walls, a first parallel terminal cavity proximate to the upper end of the first side wall of the second pair of opposed keyed side walls, and a second parallel terminal cavity proximate to the upper end of the second side wall of the second pair of opposed keyed side walls; and
    a second end wall including a second series terminal cavity proximate to the lower end of the second side wall of the first pair of opposed keyed side walls, a third parallel terminal cavity proximate to the lower end of the first side wall of the second pair of opposed keyed side walls, and a fourth parallel terminal cavity proximate to the lower end of the second side wall of the second pair of opposed keyed side walls;
  ii) a first electrode of a first polarity contained within the casing;
  iii) a second electrode of a second, opposite polarity contained within the casing and in electrical association with the first electrode through an activating electrolyte;
  iv) a first conductive terminal member in electrical contact with the first electrode and with a first terminal at the first series terminal cavity, a second terminal at the first parallel terminal cavity, and a third terminal at the second parallel terminal cavity; and
  v) a second conductive terminal member in electrical contact with the second, opposite polarity electrode and with a fourth terminal at the second series terminal cavity, a fifth terminal at the third parallel terminal cavity, and a sixth terminal at the fourth parallel terminal cavity;
b) engaging one of the first and second male keys of a first modular battery with a matched female key of a second modular battery; and
c) connecting one of the terminals of the first modular battery to one of the terminals of the second modular battery.

17. The method of claim 16 further comprising:
a) engaging the second male key of the first modular battery with the second female key of the second modular battery,
b) connecting the second terminal of the first modular battery to the third terminal of the second modular battery, and
c) connecting the fifth terminal of the first modular battery to the sixth terminal of the second modular battery.

18. The method of claim 16 further comprising:
a) engaging the first male key of the first modular battery with the first female key of the second modular battery, and
b) connecting the first terminal of the first modular battery to the fourth terminal of the second modular battery.

19. The method of claim 18 further comprising:
a) engaging the first male key of a third modular battery with the first female key of a fourth modular battery, and connecting the first terminal of the third modular battery to the fourth terminal of the fourth modular battery;
b) engaging the second male key of the first modular battery with the second female key of the third modular battery, and connecting the second terminal of the first modular battery to the third terminal of the third modular battery; and
c) engaging the second female key of the second modular battery with the second male key of the fourth modular battery, and connecting the fifth terminal of the first modular battery to the sixth terminal of the third modular battery.

20. A modular battery comprising a casing containing a first electrode of a first polarity, and a second electrode of a second polarity, the casing comprised of:
a) a first pair of opposed keyed side walls, wherein a first side wall of the first pair includes an upper end, a lower end, and a first male key, and a second side wall of the first pair includes an upper end, a lower end, and a first female key matched to the first male key;
b) a second pair of opposed keyed side walls, wherein a first side wall of the second pair includes an upper end, a lower end, and a second male key, and a second side wall of the second pair includes an upper end, a lower end, and a second female key matched to the second male key, and wherein the first male key is sized to only mate with the first female key and the second male key is sized to only mate with the second female key;
c) a first end wall including:
  i) a first parallel terminal cavity proximate to the upper end of the first side wall of the second pair of opposed keyed side walls;
  ii) a second parallel terminal cavity proximate to the upper end of the second side wall of the second pair of opposed keyed side walls; and
  iii) a first series terminal cavity proximate to the upper end of the first side wall of the first pair of opposed keyed side walls; and
d) a second end wall including:
  i) a third parallel terminal cavity proximate to the lower end of the first side wall of the second pair of opposed keyed side walls;
  ii) a fourth parallel terminal, cavity proximate to the lower end of the second side wall of the second pair of opposed keyed side walls; and
  iii) a second series terminal cavity proximate to the lower end of the second side wall of the first pair of opposed keyed side walls,
e) wherein the first series terminal cavity in the first end wall is opposite the first female key in the second side wall of the first pair and extends into the first male key in the first side wall of the first pair,
f) wherein the first parallel terminal cavity in the first end wall extends into the second male key in the first side wall of the second pair and the second parallel terminal cavity in the first end wall extends into the second female key in the second side wall of the second pair,
g) wherein the second series terminal cavity in the second end wall is opposite the first male key in the first side wall of the first pair and extends into the first female key in the second side wall of the first pair,
h) wherein the third parallel terminal cavity in the second end wall extends into the second male key in the first side wall of the second pair, and
i) the fourth parallel terminal cavity in the second end wall extends into the second female key in the second side wall of the second pair.

* * * * *

UNITED STATES PATENT AND TRADEMARK OFFICE
CERTIFICATE OF CORRECTION

| | | |
|---|---|---|
| PATENT NO. | : 8,288,035 B2 | |
| APPLICATION NO. | : 12/431278 | |
| DATED | : October 16, 2012 | |
| INVENTOR(S) | : Kevin Li | |

It is certified that error appears in the above-identified patent and that said Letters Patent is hereby corrected as shown below:

In the Claims

Column 15, line 9 insert --a-- in front of the word "second"

Signed and Sealed this
Fourteenth Day of May, 2013

Teresa Stanek Rea
*Acting Director of the United States Patent and Trademark Office*